(12) United States Patent
Trachtman et al.

(10) Patent No.: US 9,430,343 B1
(45) Date of Patent: Aug. 30, 2016

(54) USING AFFINITY TO MEDIATE BIAS IN A DISTRIBUTED STORAGE SYSTEM

(75) Inventors: Michael Trachtman, Arlington, MA (US); Bradford B. Glade, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 13/465,275

(22) Filed: May 7, 2012

(51) Int. Cl.
*G06F 7/00* (2006.01)
*G06F 17/30* (2006.01)
*G06F 11/20* (2006.01)
*G06F 11/14* (2006.01)

(52) U.S. Cl.
CPC ........ *G06F 11/2058* (2013.01); *G06F 11/1479* (2013.01)

(58) Field of Classification Search
CPC ........... G06F 11/2064; G06F 11/2069; G06F 11/2071; G06F 17/30215; G06F 2201/82; G06F 3/065; G06F 11/1458; G06F 11/2058; G06F 3/0619; G06F 3/0689; G06F 11/14; G06F 11/1456
See application file for complete search history.

(56) References Cited

U.S. PATENT DOCUMENTS

| | | | | |
|---|---|---|---|---|
| 6,493,796 | B1* | 12/2002 | Arnon et al. ................. | 711/114 |
| 2004/0030837 | A1* | 2/2004 | Geiner et al. ................ | 711/133 |
| 2004/0039888 | A1* | 2/2004 | LeCrone et al. ............. | 711/162 |
| 2005/0154845 | A1* | 7/2005 | Shackelford et al. ........ | 711/162 |
| 2006/0015507 | A1* | 1/2006 | Butterworth et al. ......... | 707/10 |
| 2006/0114917 | A1* | 6/2006 | Raisch .......................... | 370/401 |
| 2008/0256299 | A1* | 10/2008 | Iyengar et al. ............... | 711/124 |
| 2009/0055610 | A1* | 2/2009 | Shackelford et al. ........ | 711/162 |
| 2009/0150627 | A1* | 6/2009 | Benhase et al. .............. | 711/162 |
| 2010/0251010 | A1* | 9/2010 | Peters et al. ................... | 714/5 |
| 2011/0060722 | A1* | 3/2011 | Li et al. ........................ | 707/649 |
| 2012/0124640 | A1* | 5/2012 | Bender et al. ................ | 726/1 |

FOREIGN PATENT DOCUMENTS

EP          1130511 A2 *  9/2001  ............... G06F 9/46

* cited by examiner

*Primary Examiner* — Taelor Kim
(74) *Attorney, Agent, or Firm* — Anderson Gorecki & Rouille LLP

(57) ABSTRACT

In a distributed storage system in which a first copy of a set of data such as a virtualized LUN is maintained by a first site, and a second copy is maintained by a second site, access is provided to both the first site and the second site during loss of communication between the first site and the second site. Affinity determines access privileges for each site, where affinity is an indication that a particular site has or should be given permission to perform an operation to a particular part of the data set. Affinities can be specified such that permissions are non-overlapping, or overlap in a manner which is acceptable and resolvable.

27 Claims, 11 Drawing Sheets

USING AFFINITY TO MEDIATE BIAS IN A DISTRIBUTED STORAGE SYSTEM

FIELD OF THE INVENTION

This invention is generally related to distributed data storage systems, and more particularly to responding to loss of communication in such systems.

BACKGROUND OF THE INVENTION

A distributed storage system includes multiple sites which are in communication via a network. A separate copy of the same set of data may be maintained at each one of the sites. In one implementation of such a system, the data set represents a logical unit of storage (LUN) which can be presented to clients at the different sites. A client associated with a particular site may access the virtualized LUN by performing IOs on data maintained at the associated site. Changes made to data at the associated site are communicated to other sites to prompt corresponding changes which help maintain consistency of the copies of the data set across sites. Procedures may be used to prevent contemporaneous changes by different clients. For example, a portion of data such as a range of blocks can be locked down across sites so that two clients are prevented from contemporaneously modifying that data in a manner which creates inconsistency.

A problem can arise when there is a loss of communication between sites. Loss of communication can occur for various reasons, including but not limited to physical breakage of communication media (e.g., accidentally cutting a fiber), node failure, extreme weather, routine maintenance, and/or intentional scheduling of communication availability. Although loss of communication is usually temporary, there is a possibility that two or more clients at different sites could modify the same portion of data while procedures for maintaining consistency are rendered inoperative by the communication loss. For example, if two different sites were to write to the virtualized LUN then the two sites might write incompatible data. Similarly if one site were to write to the virtualized LUN and a different site were to read that data it could read stale data. Consequently, criteria such as a "bias" setting or a "vote" provided by a third "witness" site may be used to limit access to the LUN while inter-site communication is not possible. In particular, during communication breakage, only one site is permitted to access the LUN. Consequently, clients at other sites cannot read or write to the LUN. This helps ensure that data consistency is maintained, but may inhibit client progress at sites which are not provided access to the LUN.

Similarly, when there are three or more sites that are sharing the same set of data, and communication failures occur resulting in a partition of the sites, then various bias, voting, cluster witness or other quorum rules can be used to give write or read access to a subset of nodes that are in communication with each other and to prohibit write or read access from other nodes and thereby maintain data consistency until such time as communication is restored and all copies of the sets of data can be made consistent with each other.

SUMMARY OF THE INVENTION

In accordance with an aspect of the invention an apparatus comprises: a first data storage device associated with a first site, a first copy of a set of data being maintained on the first data storage device; a second data storage device associated with a second site, a second copy of a set of data being maintained on the second data storage device; an interface for communicating between the first site and the second site to maintain consistency of the data; and control logic operative in response to loss of communication between the first site and the second site to provide access to at least a first part of the first copy of the data set at the first site, and provide access to at least a second part of the second copy of the data set at the second site, and in response to restoration of communication between the first site and the second site to resolve differences between the first copy and the second copy.

In accordance with an aspect of the invention an apparatus comprises: a first data storage device associated with a first site, a first copy of a set of data being maintained on the first data storage device; a second data storage device associated with a second site, a second copy of a set of data being maintained on the second data storage device; a third data storage device associated with a third site, a third copy of a set of data being maintained on the third data storage device, and potentially a fourth or more similarly configured storage devices, storage sites and sets of data; an interface for communicating between the sites to maintain consistency of the data; and control logic operative in response to loss of communication between some subset of the sites that results in either a logical or physical partition of the sites into two (or more) groups in which the sites of the each group have communication with each other but do not have communication with other sites and in response to restoration of communication between the groups of sites to resolve differences between the various copies.

In accordance with another aspect of the invention a method of operating a distributed storage system comprises: maintaining a first copy of a set of data by a first site; maintaining a second copy of the set of data by a second site; communicating between the first site and the second site to maintain consistency of the data; in response to loss of communication between the first site and the second site, providing access to at least a first part of the first copy of the data set at the first site, and providing access to at least a second part of the second copy of the data set at the second site; and in response to restoration of communication between the first site and the second site, resolving differences between the first copy and the second copy.

One advantage of some aspects of the invention is that access to a data set can be provided to more than one site during loss of communication. This advantage is realized by using affinity to determine access privileges for each site, where affinity is an indication that a particular site has or should be given permission to perform an IO (Input/Output) operation to a particular part of the data set. Affinities can be specified such that permissions are non-overlapping, or overlap in a manner which is acceptable and resolvable when communication is restored.

Another advantage of some aspects of the invention is that differences between copies of data sets can be automatically resolved. In other words, a data storage device can be "repaired" upon inspection of read and write activity that occurred at each site following restoration of communications. This may be accomplished using plug-in resolvers.

Other features and advantages of the invention will be more apparent from the detailed description and the drawings.

DETAILED DESCRIPTION

Aspects of this description are simplified to facilitate understanding of the principles and conceptual features of the invention to those of ordinary skill in the art. No attempt is made to show structural aspects in more detail than is necessary for a fundamental understanding. Furthermore, a simplified example with two sites is shown, but the principles and conceptual features described herein are not limited to two sites. Furthermore, multiple sites may be partitioned into two or more sets or groups of sites, where each set or group of sites retains communication with each other, but every two sets or groups of sites have no (or insufficient) communication with each other. Hence, the terms "group," "set" and "site" should be broadly interpreted to include sites and partitions of sites. Furthermore, although files are used in the description and conceptual features described herein are applicable to any type of "set of data."

Aspects of the invention may be implemented wholly or partly using computer program code. The program code may or may not operate in a distributed manner. However it is implemented, the program code will be stored in computer-readable non-transitory memory and utilized by processing hardware.

Figure 1:
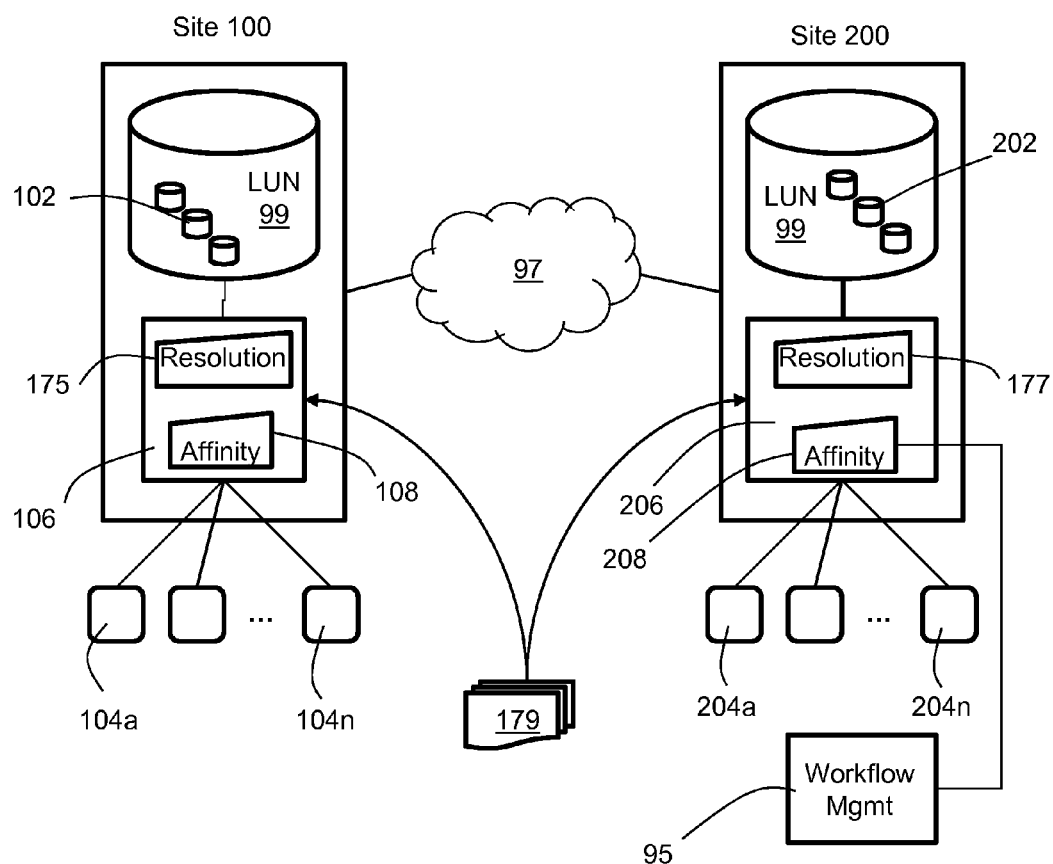
FIG. 1 illustrates a simplified distributed data storage system in which a virtualized LUN is maintained across multiple sites.

FIG. 1 illustrates a simplified distributed data storage system in which a virtualized LUN 99 is maintained across at least two sites (site 100 and site 200) which are in communication via a network 97. Physical data storage resources 102, 202 at each site maintain separate copies of the data associated with the LUN. Clients 104a-104n and 204a-204n associated with the sites are able to access the data storage resources, and thus the LUN, via server nodes 106, 206. The server nodes may include block servers, and one server node might support multiple sites. Moreover, the server nodes may be integrated with other devices. The servers maintain communication via the network in order to maintain data consistency. For example, the servers lock down portions of data that have been "checked out," signal an indication of local data modifications to other sites, and mirror local changes signaled from other sites.

Figure 2:
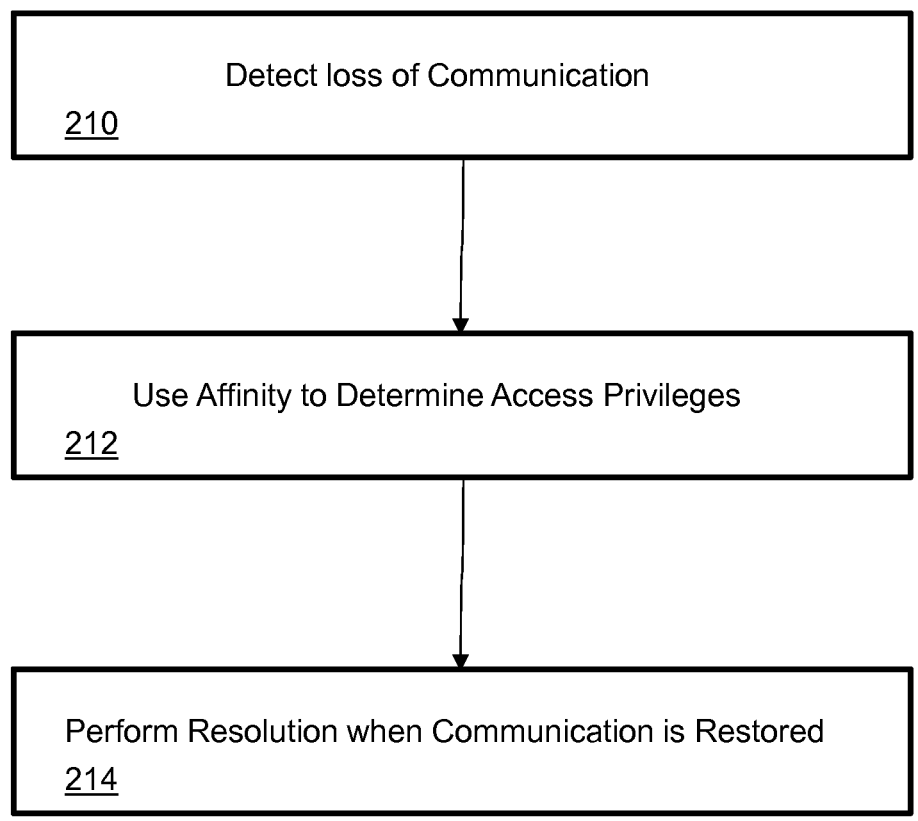
FIG. 2 illustrates steps for using affinity in a distributed storage system.

Referring to FIGS. 1 and 2, in contrast with problematic prior art systems which only allow one site to access the virtualized LUN during loss of inter-site communication, access to the illustrated LUN 99 is shared between sites during loss of inter-site communication. In particular, upon detecting a loss of communication at step 210, "affinity" 108, 208 is used to determine access privileges at step 212. Affinity is an indication that a particular site has or should be given permission to perform an IO to a particular set of data, including parts thereof, e.g., device-blocks; files or directories in a file system (or byte ranges in a file, or subsets of entries in a directory), tables, rows or columns in a database; particular keys in a key-value store; specific mailboxes in an email system, specific customer accounts in a customer relationship management (CRM) system; specific objects in any object based store; and the like or equivalent during a period of communication loss. In what follows, we will use the word data-segment to mean an identifiable piece of data such as those listed in the prior sentence, and range-of-data-segments to mean a contiguous set of data under some metric of contiguity. Affinity is orthogonal to traditional access permissions (ACLs) because in at least one embodiment it is only used during communication loss scenarios. The servers 106, 206 are adapted to utilize affinity to enforce access privileges for clients during periods of loss of inter-site communication. Consistency between records of affinity is maintained using any of the various techniques for maintaining data consistency when inter-site communication is available. A resolution step 214 is performed when communication is restored in order to restore inter-site data consistency, if necessary. Techniques for detecting loss and restoration of communication are well understood in the art and will not be described further. Using affinity to determine access privileges and performing resolution are described in greater detail below.

In general, affinity may be based on either or both of manual input and automated calculations. In a simple example, IT administrators can explicitly set the affinity of a particular node(s) to particular sets of data. It is also contemplated that affinity may be determined based on rules associated with a workflow management system 95. For example, and without limitation, workflow management system rules can be translated into an affinity map or a set of affinity rules. For example, if it is known that one site works with the data during daylight hours and the other site works with the data during night time hours, then affinity can automatically transfer based on these workflow management rules. Another example could be using the customer's country code in a CRM to place affinity with the primary server that is serving customers in that country.

Figure 3:
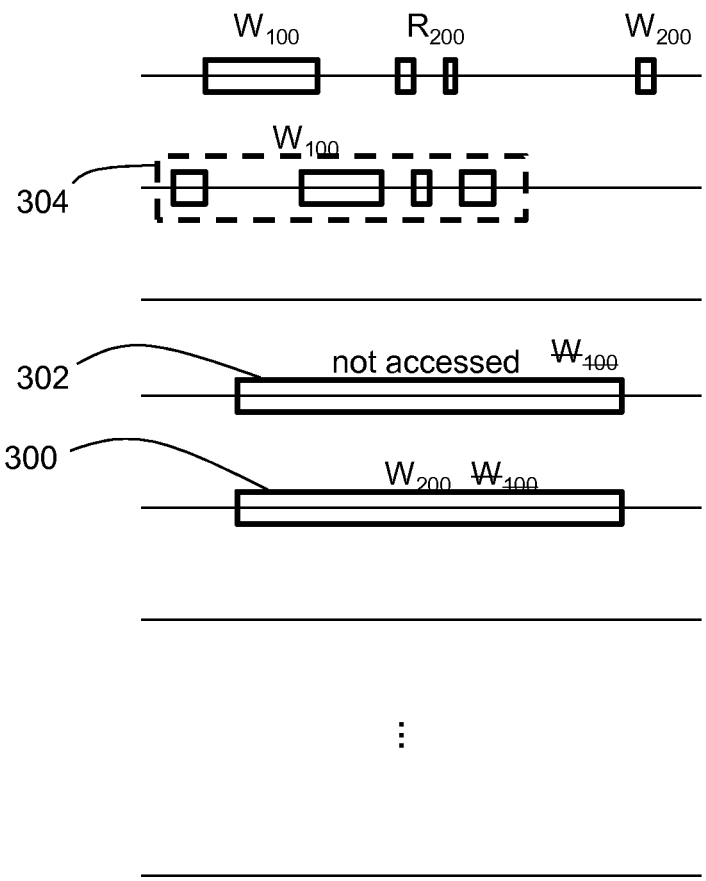
FIG. 3 illustrates affinity in an unstructured data environment.

Referring to FIGS. 1 and 3, affinity may be determined based on previous IOs. For each data-segment or range of data-segments of storage, a record may be maintained of which site has most recently performed either or both a Read and a Write, e.g., $W_{100}$ indicates a Write by site 100 in FIG. 3. The record might include a map in which new entries overwrite old entries for a given data-segment. Consequently, if a range of data segments 300 that was marked as having been written by site 100 and is subsequently written by site 200, the map will replace the indication ($W_{100}$) of the Write by site 100 with the indication ($W_{200}$) of the Write by site 200. Affinity can be determined based on the mapping. For example, the site which most recently performed a Write to a data segment or range of data segments may be granted affinity, e.g., such that it is the only site permitted to Read/Write to that data segment during communication loss. Alternatively, only the site which most recently performed either a Read or a Write is granted affinity, e.g., permitted to Read/Write to that segment or range of segments during communication loss. Alternatively, Read and Write permissions can be kept separate and the last site which most recently performed a Write would be granted Write affinity, and the last site which most recently performed a Read would be granted Read affinity. The site that was granted Write affinity may also be granted Read affinity; especially if its Write patterns are Read-Modify-Write cycles, as opposed to writes-at-the-end-of-the-data-set type writes, or "obliviously-replace-content-without-looking-at-the-priorcontent type writes." However, affinity does not necessarily imply exclusive access. For example, other sites may or may not be permitted to perform certain IOs for that data segment or range of data segments, e.g., depending on whether the possibility of conflicting Writes or Reads of stale data presents a greater risk than temporarily disabling Writes or Reads.

In a variation, the range of data segments that share the same affinity can be identified using a clustering algorithm that identifies ranges of data segments that likely have the same IO usage profile.

In a variation of the embodiment described above, stale entries are timed out. For example, a Read or a Write entry becomes a "not accessed" entry after a predetermined period of time without further IO activity. A data-segment or range of data-segments 302 marked "not accessed" may default during communication loss to exclusive Write or Read/Write by a particular site, or be available for Reads by all sites but Writes by only one site, or may be available for Reads and Writes by all sites. For example, Reads and Writes by all sites might be permitted if there is a relatively low likelihood of conflicting Writes to a data-segment which is rarely accessed. Further, there may be a possibility of resolving the conflicting Writes if they occur. Those skilled in the art will readily appreciate which variations are more suitable for particular scenarios based on factors such as what the data represents and how it is used.

In another variation of the embodiment described above, data-segments are grouped and affinity is applied to groupings of data-segments. Groupings can be calculated based on clustering algorithms which are known for predicting associations between IOs. For example, it may be calculated that multiple Writes by a particular site are associated, e.g., with a particular file or directory. Furthermore, it may be calculated that other data-segments which have not been subject to Writes are also associated with the group, e.g., based on position. Consequently, exclusive affinity may be given to a particular site for a group of data-segments 304 that includes one or more data-segments marked with most recent Reads or Writes and also one or more data-segments which are marked in some other manner but calculated to be associated with the grouping.

Figure 4:
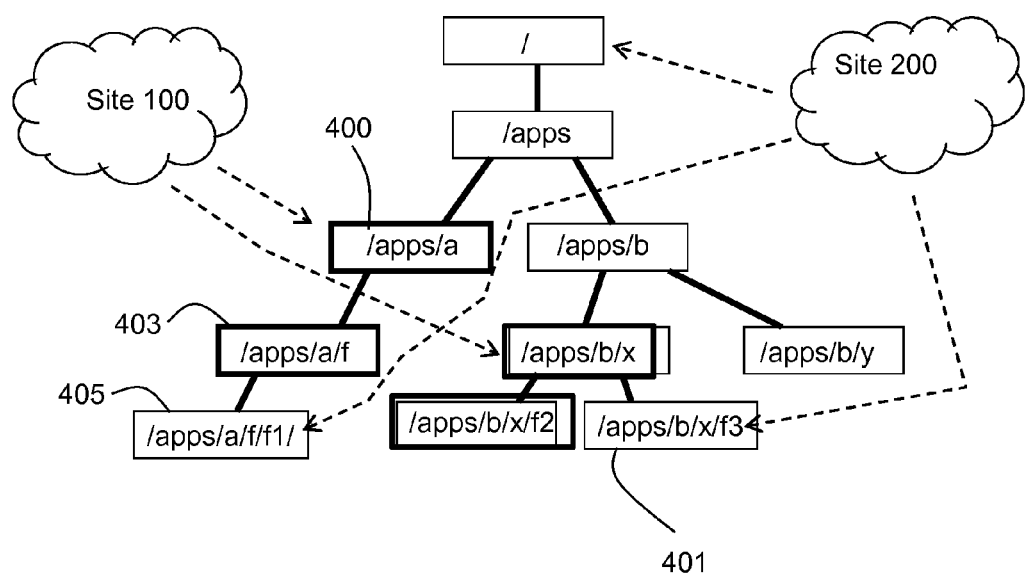
FIG. 4 illustrates affinity in an structured data environment.

Referring now to FIGS. 1 and 4, information about the structure of the data may be used to determine affinity in a manner which further enhances data processing/workflow progress during communication loss. For example, a file-system may be mounted on the LUN and each site may be granted affinity to particular files or directories. Consequently, clients 104a, 204a at different sites 100, 200 working in different directories 400, 401, or in different files in the same directory, are able to continue to do so even after loss of communication by having affinity to those directories or files. However, the two clients working in different directories might be prevented from transferring files between those directories or taking other actions which would create inconsistencies during a period of communication loss.

In one embodiment affinity to subdirectories or files may be inherited. In particular, in a hierarchical data structure affinity (such as a file system hierarchy) is inherited to data under a level at which affinity is directly granted. Further, inherited affinity may be overridden by a different affinity, e.g., directly grated affinity. For example, site 100 has direct affinity to directory 400, and inherited affinity to directories 403, 405, and the inherited affinity to directory 405 by site 100 is overridden by a direct assignment of affinity to site 200.

Figure 5:
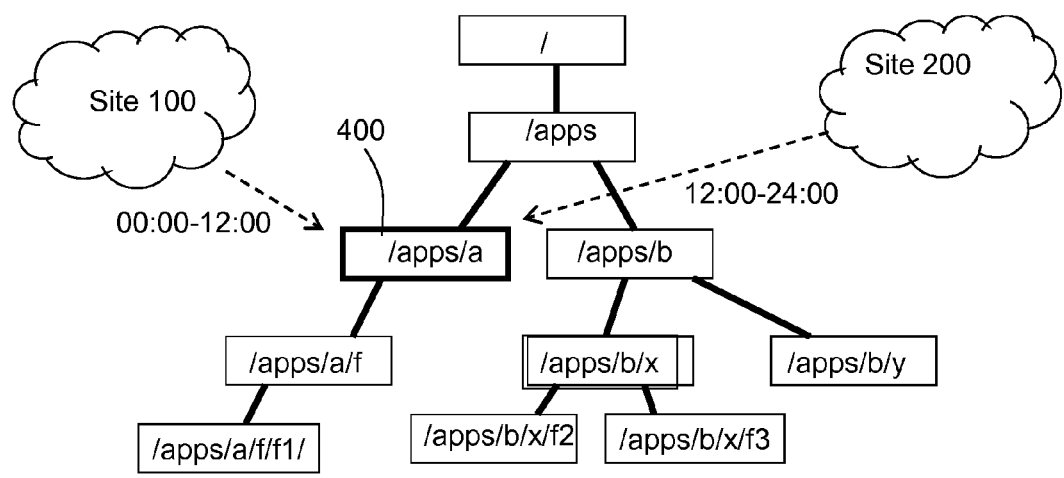
FIG. 5 illustrates real-time affinity changes.

Referring to FIGS. 1 and 5, affinity may be changed in real time based on criteria other than most recent Read/Write. For example, if some particular type of file is routinely created by site 100 and subsequently modified by site 200 then site 200 could be provided with affinity to a file of that type before site 200 performs any Reads or Writes to the file. Similarly, if some file or directory 400 is used by site 100 during a first daily time period and used by site 200 during a second daily time period, affinity can be changed to match those usage patterns. An indication that a particular set of data will be handled in a manner which is suitable for such a change of affinity may be gained, for example and without limitation, from the work-flow management system 95, or by tracking and granting access dynamically during connected operation.

Figure 6:
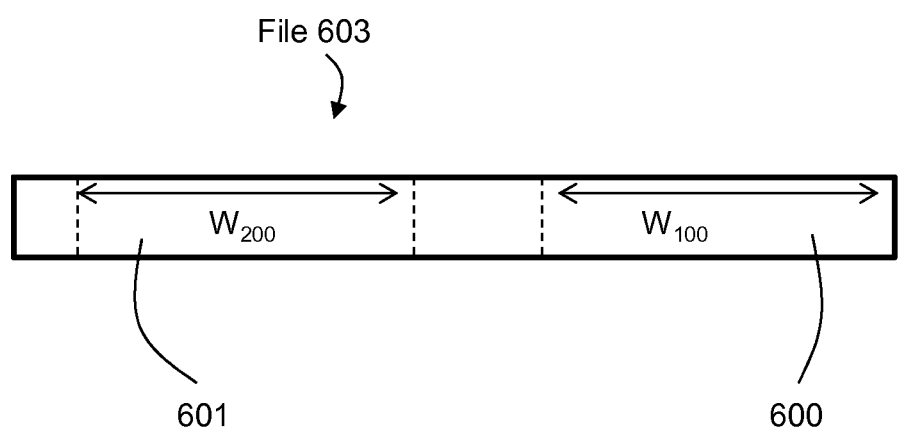
FIG. 6 illustrates assignment of affinities to different parts of a file.

Referring to FIGS. 1 and 6, affinity can also, or alternatively, be applied to a granularity such as one or more byte ranges in a file. In certain situations, e.g., "big-data" scenarios such as film-editing, the same file is processed by multiple sites. Often, the file will be relatively large and clients at different sites process different parts of the file. For example, site 100 might be working on colorizing the $3^{rd}$-$7^{th}$ scenes of a movie file 603 at range 600 while site 200 is working on adding musical-scoring to the $10^{th}$-$12^{th}$ scenes of the movie at range 601. A mutual locking mechanism, and/or change control system, is used to avoid conflicting IOs when inter-site communication is available. For example, a client associated with site 100 would "checkout" the scenes to be colorized. In such situations, progress during communication loss may be facilitated by linking affinity to the "checkout" process. For example, site 100 would have affinity to the byte range(s) 600 associated with the $3^{rd}$-$7^{th}$ scenes of the movie. Similarly, site 200 would have affinity to the byte range(s) 601 associated with the $10^{th}$-$12^{th}$ scenes of the movie because the client on site 200 would "checkout" those scenes for musical scoring. Consequently, progress on at least the checked-out data is possible during communication loss. Other levels of granularity which are unambiguously understood can alternatively be used. For example, one site may be allowed to modify the first ten paragraphs of a document while the other site may be allowed to modify all subsequent paragraphs. Similarly, the system may allow any site to check out scenes that were not checked out when the communication loss occurred under the premise that the likelihood that more than one site will perform unreconcilable edits on the same scene at the same time is negligible, or that it is possible that the two sites will coordinate their work using other mechanisms such as telephone based coordination or that in the worse case the work of all but one of the sites will have to be redone, but at least some work will be salvageable and that not all the employee time during the communication loss will be wasted.

Figure 7:
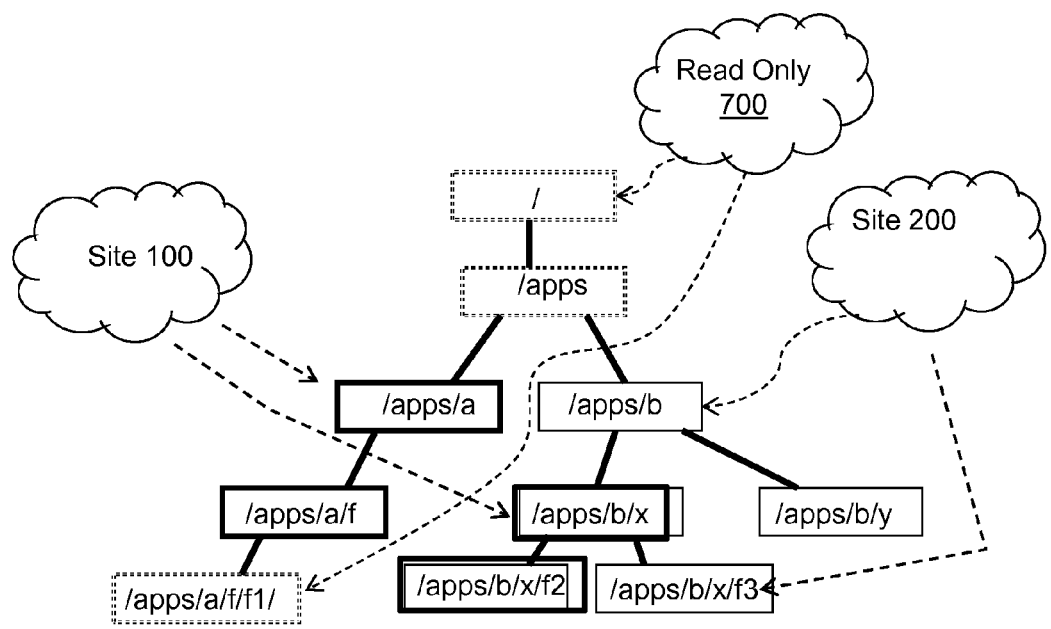
FIG. 7 illustrates Read Only affinity.

Referring to FIG. 7, in another embodiment one or more files or directories are assigned "Read Only" affinity 700. Files and directories with Read Only affinity are made available for Reads by all sites. Read Only affinity can be applied, for example, to files and directories that are not being actively modified. Alternatively, it may be applied as the default mode for the entire file-system by providing it on the root-directory of the file-system. Further, Read Only affinity can mean that any site may read the data at any time, e.g., during loss of communication and also when inter-site communication is available. Typically, the system is configured such that Read Only affinity directly applied to a file or directory, or inherited downward, is overridden by direct and inherited affinities to specific sites.

In various other embodiments described below different affinities may be applied contemporaneously, i.e., blended. When blended affinity is applied to a data set, different sites have different access privileges to that same data set. In other words, multiple affinities are applied to the same data set. Blended affinity is advantageous in situations where conflicts or the possibility of reading stale data is either negligible, tolerable or easily reconciled.

Figure 8:
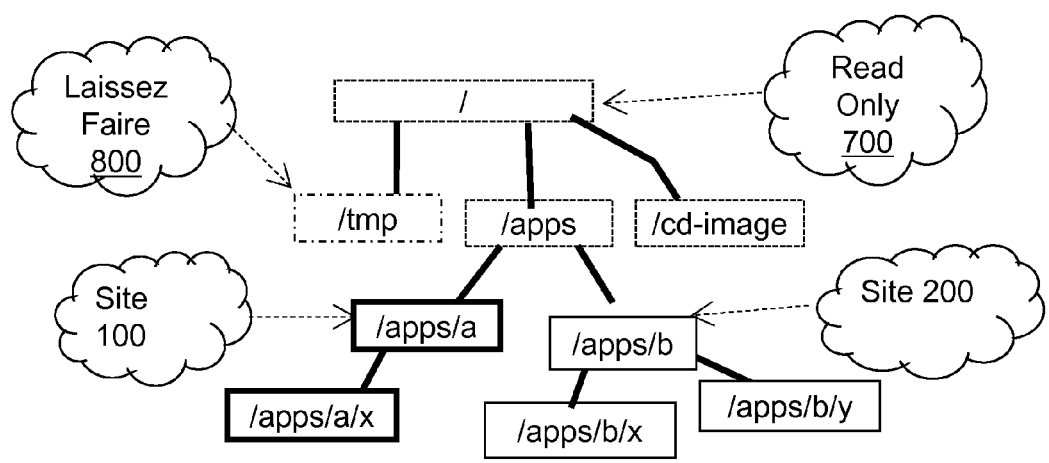
FIG. 8 illustrates Laissez Faire affinity.

Referring to FIG. 8, one type of blended affinity is Laissez Faire affinity 800. Laissez Faire affinity allows all sites to perform IOs to a data set, e.g., read, create, append and modify of a file or directory. This advantageously facilitates progress at multiple sites, but there is a risk of both data staleness and semantic-consistency of the data. Further, create operations performed in parallel can lead to the same file name being used to create two different files with the same name or purpose. Still further, append operations may allocate the same logical region of a disk to two separate files. Consequently, Laissez Faire affinity will typically be applied only in certain situations. For example, it is suitable for situations where data corruption is unlikely to occur, or where all data consistency conflicts are likely to be resolvable, e.g., where work-flow guarantees or other mechanisms ensure that the data can be resolved once communication is restored. In the illustrated example Laissez Faire affinity 800 is applied to a temporary directory (e.g. "/tmp") where each site creates files using unique identifiers (UIDs such as their IP address) as part of their file names. This application-convention can help guaranty that the two sites will never create conflicting content. During the reconciliation step following restoration of communication the two or more versions of the temporary directory can be resolved by adopting the convention that all files with UIDs in them that exist in any site are placed in the repaired version of the directory.

A special procedure may be used where stale data is still being used when communication is restored. For example, if site 100 made changes to the file while site 200 had read-affinity which it used to read the file, site 200 would be using stale data. If the application on site 200 is still reading that file when communication is restored then a snapshot of the stale data may continue to be used by the process on site 200. The snapshot would be deleted after the process on site 200 completes. This ensures that site 200 will work with a consistent-to-itself view of the data.

Figure 9:
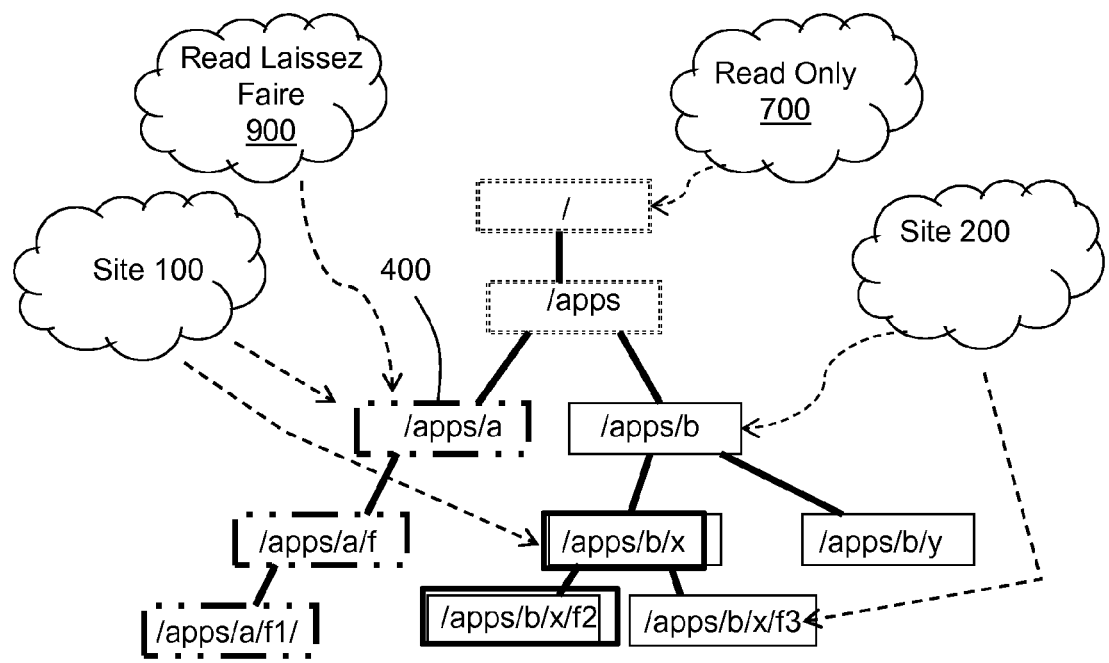
FIG. 9 illustrates Read Laissez Faire affinity.

FIG. 9 illustrates a Read-Laissez-Faire variation of blended affinity. Read-Laissez-Faire affinity 900 allows one site to have Write affinity to a data set such as a file or directory, and at least one other site to have Read affinity to the data set. For example, site 100 could have Read/Write permission to directory 400 while site 200 has Read permission to directory 400 (based on Read Laissez Faire affinity 900). It will be appreciated that site 200 will Read stale data if a Read of directory 400 is performed after a Write to directory 400 by site 100, where both IOs occur during loss of communication. However, it will also be appreciated that such a risk may be appropriate in certain situations. For example, a risk of reading stale data may be acceptable when the stale data is still valid for an extended period of time, when the data is rarely subject to Writes, or when the Writes are unlikely to be associated with critical changes. Examples of such data include social-networking elements of some web-sites. For example, it may be acceptable if an Internet retailer shows potentially stale versions of product-descriptions or product-reviews to customers, even if those product descriptions or product reviews have been updated on some other site during a loss of communication, because product-descriptions or product-reviews may be unlikely to be associated with critical changes. Sites would have to determine what a "critical change" is. For example, some Internet retailers may consider price changes to be a "critical change", while others may be willing to honor stale pricing during the duration of a communication loss.

A variation of Read-Laissez-Faire affinity is timed-expiration for the Read-Laissez-Faire affinity. Timed-expiration for the Read-Laissez-Faire affinity causes the Read portion of the affinity to expire after a predetermined period of time. For example, Reads by sites other than the site with Write affinity might be configured to expire 24 hours after a communication loss is detected. This allows sites with Read affinity to progress using potentially stale data for the predetermined period of time. If communication is not restored by the end of this period of time then the Read affinities lapse and those sites cannot perform Reads of the data set. However, the site with Read/Write affinity may continue to perform Reads and Writes.

In some embodiments the affinity determination based on previous IOs described above can be applied when the data structure is known. For each file or directory, for example, a record may be maintained of which site has most recently performed either or both a Read and a Write. The record might include a map or table in which new entries overwrite old entries for a given data set such as a file or directory. Affinity is determined based on the record. For example, the site which most recently performed a Write to the file or directory may be the only site permitted to Read/Write to that file or directory during communication loss. Alternatively, only the site which most recently performed either a Read or a Write of the file or directory is permitted to Read/Write to that file or directory during communication loss. Furthermore, stale entries may be timed out.

It should be noted that the operations associated with affinity to directories are not necessarily the same as the operations associated with affinity to files. Primary operations associated with directories include read-directory (and associated information), create file, delete file and possibly rename file, access file meta data or modify file meta data, whereas the primary operations associated with files include Read and Write, or in a more sophisticated environment, sequential reads, random reads, append, modify or erase/delete. It will be appreciated that separate treatments of Read and Write affinities described herein could be applied to the operations associated with directories. For example, create, delete, change file attribute and rename operation affinity could reside with one site while read-directory could be shared.

In another variation affinity restrictions are applied to affinity relationships. Affinity restrictions can limit affinities in terms of client ID, filename, directory name, time, and any other expression that can be processed. For example, Laissez Faire affinity on the/tmp directory 800 (FIG. 8) could be subject to a scope restriction that site 100 is given the Laissez Faire affinity for any file that matches the pattern/tmp/site1?* while site 200 is given the Laissez Faire affinity for all other files. Further, that affinity or affinities for opening a file or directory can be restricted to specific times.

Figure 10:
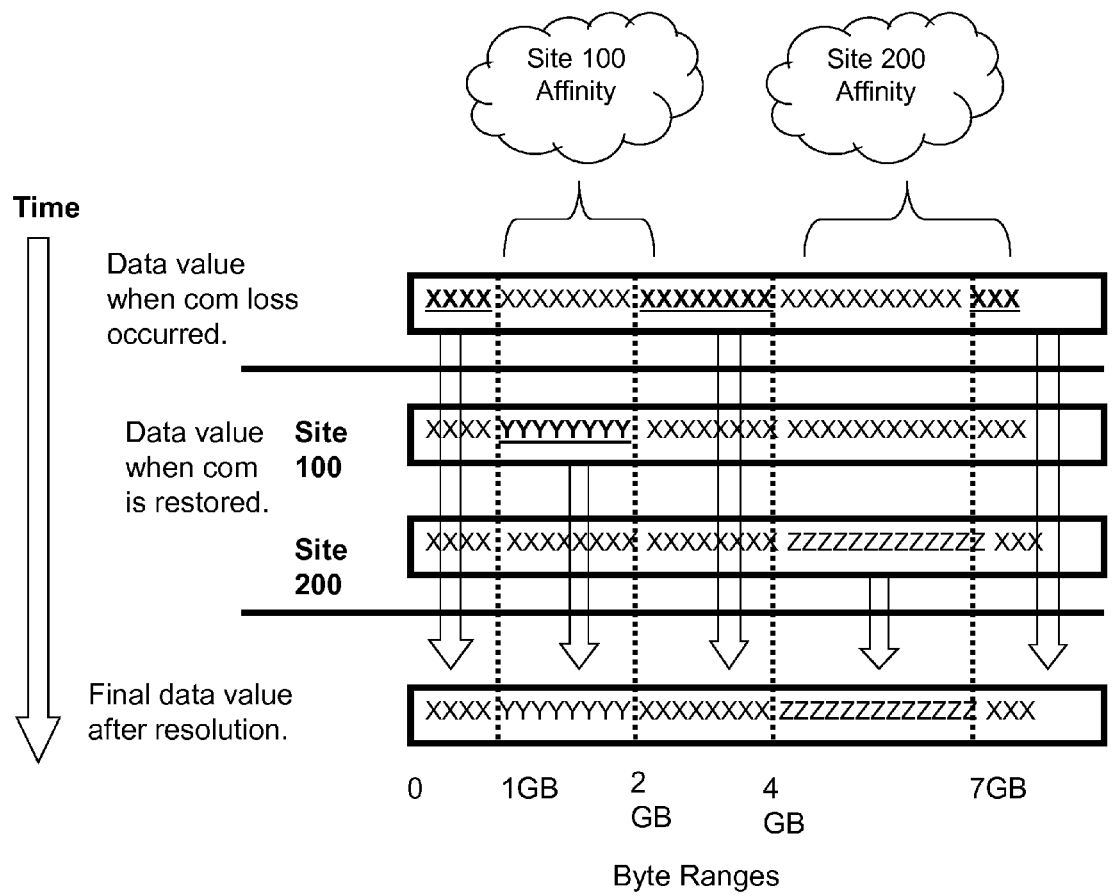
FIG. 10 illustrates data resolution.

Referring to FIGS. 2 and 10, the resolution step 214 is performed when communication is restored in order to provide inter-site data consistency. In particular, the data that exists at the sites is reconciled to recreate a single view of that data, e.g., the virtual LUN. Resolver software may utilize file-system semantics (merge of discrete updates) and affinities to perform resolution. In a case where affinities limit the number of sites that can possibly modify any particular data set to at most one site, any changes that the site made are copied to other sites. For example, one simple resolution strategy is if site 100 had affinity for a particular byte range within a file, then any changes that site 100 made during the communication loss would be the resolved value for that byte range.

Resolution is performed at the directory entry level in the case of changes to a directory. For example, last file accessed time can be set to the latter of all the file accessed times across all sites.

Other resolution strategies are also possible. For example, in some cases, reading a time-order-merged journal of the two or more sites and then processing that journal would work. This merged journal may end up reporting some steps that could not be implemented; for example if one side deleted some information and then the other side tried to modify it. Still, such an approach would give a concise list of what was able to be merged and what was not. Automated or manual intervention could be used to resolve those last outstanding items. Journaled approaches could work for many kinds of data sets including files, databases and others. Items that were repeated in both journals (for example, deletions) could be merged; it is likely acceptable if both sides deleted the same item. This journal could either be explicitly created during the duration of the communication outage, or implicitly constructed during the resolution phase after communicating has been restored. Similarly, in many "database like situations" where there is a 1 to N or N to N relationship between entities in the database, and items were added or deleted on the N side of the relationship; that the resolution would indeed encompass all the changes. An example is email, (which is a 1 to N relationship between an email-box and the emails within it)—any changes made by either side would be accepted. An additional possible feature of the "resolving software" is that through the plug-in or through an eventing mechanism, software that had used that data could be informed of changes that may have been "retroactive" and be given the opportunity to handle those situations. This allows software to "fix the problems" that were caused by its using stale data.

Figure 11:
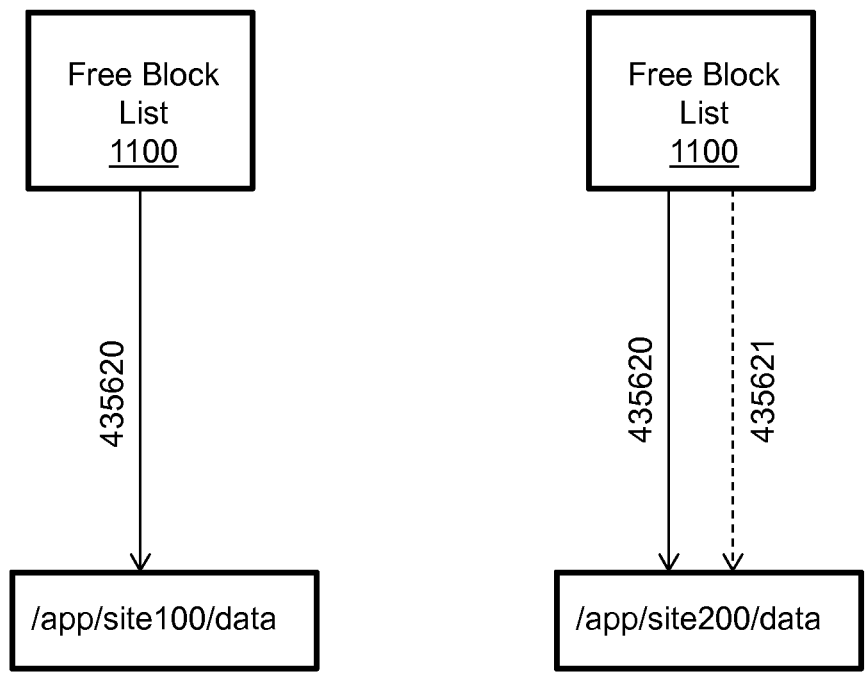
FIG. 11 illustrates resolution of free block allocation inconsistency.

Referring to FIG. 11, even in the case where affinities permit only one site to modify any particular data set there may be a possibility of inconsistency of free block allocation. When two sites append to an existing file or create a new file, free block are used from a free data-segment list 1100. When communication is available the sites coordinate using file system software to use the free data-segment list in a non-conflicting manner. However, when during loss of communication it is possible that the two sites will use the same data-segment. For example, if site 100 appends to file /app/site100/data and site 200 appends to file /app/site200/data, both sites may choose to use LUN block number 435620 to add a block to their respective files. This conflict can be resolved by moving the block for one of the sites to a different available free block. In particular, the data can be moved to a different block number and the file-block-list pointers for the file, e.g., /app/site200/data, can be updated to point to the new block number. This change of block number can be physical, e.g., move to another physical block, or logical, e.g., add an extra level of indirection to just change the logical number of the block while maintaining its physical location.

Another strategy is that each site is given its own list of free blocks. Each list is different than the lists of free blocks that are given to all other sites. Each site would then only use blocks from its free block list when allocating new blocks during the course of communication failure. When the sites are in communication with each other, they would continuously update these available per-site free block lists to make sure that each site has an adequate supply of free blocks. This strategy would simplify reconciliation since no two sites would allocate the same blocks. When a site uses up all the blocks on its own per-site free block list, it might make use of other free blocks that are not on its own per site free block list, and then the reconciliation strategies described earlier could be used.

File changes such as file name changes, new links to files, file deletions and file creation may require more complex resolution procedures. For example, if two or more sites created (or deleted) files in the /tmp directory using some file naming convention (e.g. as described earlier), then those sites would not have created the same file. In that case, the resolved directory would be based on the sum of all the changes made by both sites. Custom resolvers can be utilized if there is the potential that multiple sites made directory changes to the same file. One example of a custom resolver is for Laissez-Faire affinity Resolution. Custom resolvers might require human intervention to decide the best way to handle both sites making changes to the same file or directory. Alternatively an automated algorithm may be sufficiently aware of the underlying work-flow, file structure and file use conventions to automatically resolve the differences. Automated custom resolvers can work based on the semantics of the data set, e.g. at a file-level (and not at a block level) so as to guaranty that the data set (such as a file system) remains consistent, e.g., would pass programs like the Linux command fsck. Similar considerations would apply to other structured data sets such as data bases, email systems, CRM systems, key value pair storage and the like.

It will be appreciated by those skilled in the art that certain modifications may be desirable depending on the networked storage environment. For example, it is desirable that the file system is in, or can be placed in, a consistent state when communication loss occurs. OCFS2 (Oracle Cluster File System 2), NFS (Network File Systems), CIFS (Common Internet File System) and others support this functionality. However, modifications might be desirable if the functionality were not supported. Further, some of the variations described herein assume that the file system has a tree based naming hierarchy. However, Posix compliant file systems generally do not strictly obey this rule, e.g., a file may exist in multiple locations within the file system due to "hard links" to the inode. Consequently, variations such as affinity inheritance by sub-directories and files can lead to ambiguous situations. Modifications or use of different variations might therefore be selected in such situations.

Referring again to FIG. 1, as mentioned, in another embodiment either or both affinities 108, 208 and resolutions 175, 177 are implemented using plug-ins 179. Each LUN could be assigned a plug-in, instances of which could be integrated into the block servers and invoke callbacks when various events occur. Such events could include file-reads, file-writes and other block level IO commands. When a loss of communication occurs the server would use the plug-in associated with the LUN to determine whether to allow the IO or not. A default plug-in could use block level semantics that use bias or quorum voting with the witness to decide if to allow the IO or not. Alternative plug-ins would be used, for example, to implement file-oriented affinity, database-oriented affinity scheme that is outlined below or some other custom decider for which IOs should be allowed on each site during a split-brain. If the IO is not allowed, then an IO error (data not available) would be sent to the host that issued the IO command. The file system could then react as it always does for failed disks. A plug-in could also be installed and called to resolve changes when communication is resumed.

Some of the affinities and resolutions described above would not require file system modification. However, in an alternative embodiment at least some of the features are integrated into the file system. For example, it may be advantageous to integrate Free Block resolution into the file system, and also a modification to journal all changes made to the file-system during the loss of communication.

It will be appreciated that the principles described above can be generalized to data formats other than file systems. For example, if a LUN hosts a database then affinity rules can be created that are database centric. Database affinities could be created for particular tables, particular rows or columns of tables, and particular meta-data operations such as creating or deleting tables, changing the structure of tables, etc. Particular rows to which an affinity applies can be based on SQL using clauses or more comprehensive regular expressions. For example, one site may be assigned the affinity for all customers with one set of zip codes, while the other site could be assigned the affinity for all customers with a different set of zip codes. Other plug-ins could be created for Microsoft Exchange LUNs or other software that directly deals with a LUN and creates its own structure on that LUN for example to split affinity based on the last known geographic location of a mailbox owner. In the case of a database and other scenarios, "file-system like semantics" would be used to preserve the underlying data structural integrity, as well as the lower level data-semantic integrity.

In view of the teaching above it will be appreciated that a more complex implementation could comprise: a first data storage device associated with a first site, a first copy of a set of data being maintained on the first data storage device; a second data storage device associated with a second site, a second copy of a set of data being maintained on the second data storage device; a third data storage device associated with a third site, a third copy of a set of data being maintained on the third data storage device, and potentially a fourth or more similarly configured storage devices, storage sites and sets of data; an interface for communicating between the sites to maintain consistency of the data; and control logic operative in response to loss of communication between some subset of the sites that results in a partition of the sites into two (or more) groups in which the sites of the each group have communication with each other but do not have communication with other sites and in response to restoration of communication between the groups of sites to resolve differences between the various copies.

While the invention is described through the above exemplary embodiments, a wide variety of modifications to and variations of the illustrated embodiments may be made without departing from the inventive concepts herein disclosed. Moreover, while the exemplary embodiments are described in connection with various illustrative structures, the concepts and features may be embodied using a wide variety of specific structures. Accordingly, the invention should not be viewed as limited except by the scope and spirit of the appended claims.

What is claimed is:

1. Apparatus comprising:
    a first non-transitory physical data storage device associated with a first site, a first copy of a set of data being maintained on the first data storage device;
    a second non-transitory physical data storage device associated with a second site, a second copy of the set of data being maintained on the second data storage device;
    an interface for communicating between the first site and the second site to maintain consistency of the first and second copies of the set of data; and
    control logic stored in computer-readable non-transitory memory and utilized by processing hardware, the control logic responsive to loss of communication between the first site and the second site to provide access to at least a first part of the first copy of the data set at the first site during the loss of communication between the first site and the second site, and provide access to at least a second part of the second copy of the data set at the second site during the loss of communication between the first site and the second site, the second part comprising different data than the first part, and in response to restoration of communication between the first site and the second site to resolve differences between the first copy and the second copy, wherein the control logic uses affinity to control access to the first copy and the second copy, where affinity is an indication that a particular site has or should be given permission to perform an operation to a particular part of the set of data.

2. The apparatus of claim 1 wherein the control logic determines affinity based on access history.

3. The apparatus of claim 2 wherein affinity to the part of the set of data is assigned to either the first site or second site based on whether the first or second site most recently modified the part of the set of data.

4. The apparatus of claim 2 wherein the control logic times-out records of most recent modification.

5. The apparatus of claim 1 wherein the control logic uses file system semantics to assign affinity to at least one of: a particular set of data, a part of a set of data, a directory in a file system, a set of directories in a file system, a file in a file system, a set of files in a file system, a part of a file, device-blocks, a data segment, a group of data segments, a range of data segments, a byte range or set of ranges in a file, subsets of entries in a directory, tables in a database, rows in a database, columns in a database, particular keys in a key-value store, specific mailboxes in an email system, and specific customer accounts in a CRM system, and specific objects in an object store of some kind.

6. The apparatus of claim 5 wherein the set of data is hierarchical or predominately hierarchical, and wherein the control logic assigns inherited affinity based on hierarchy.

7. The apparatus of claim 5 wherein the control logic reassigns affinity based on a recognized justification during loss of communication.

8. The apparatus of claim 1 wherein the control logic assigns Read Only affinity which causes an associated part of the set of data to be readable by all sites.

9. The apparatus of claim 1 wherein the control logic assigns Laissez Faire affinity which allows all sites to make changes to an associated part of the set of data.

10. The apparatus of claim 1 wherein the control logic assigns Read-Laissez-Faire affinity which allows the first site to have Write affinity to an associated part of the set of data and the second site to have Read affinity to the associated part of the set of data.

11. The apparatus of claim 1 wherein the control logic applies restrictions to affinity based on client ID, filename, directory name, time, or any other expression that can be processed.

12. The apparatus of claim 1 wherein the control logic automatically resolves at least some differences between the first copy and the second copy.

13. The apparatus of claim 12 wherein the control logic includes a plug-in resolver.

14. A method of operating a distributed storage system comprising:
   maintaining a first copy of a set of data by a first site;
   maintaining a second copy of the set of data by a second site;
   communicating between the first site and the second site to maintain consistency of the first and second copies of the set of data;
   in response to loss of communication between the first site and the second site, providing access to at least a first part of the first copy of the data set at the first site during the loss of communication between the first site and the second site, and providing access to at least a second part of the second copy of the data set at the second site during the loss of communication between the first site and the second site the second part comprising different data than the first part;
   using affinity to control access to the first copy and the second copy, where affinity is an indication that a particular site has or should be given permission to perform an operation to a particular part of the set of data; and
   in response to restoration of communication between the first site and the second site, resolving differences between the first copy and the second copy.

15. The method of claim 14 including determining affinity based on access history.

16. The method of claim 15 including assigning affinity for a third part of the set of data to either the first site or second site based on whether the first or second site most recently modified the third part of the set of data.

17. The method of claim 15 including timing-out records of most recent modification.

18. The method of claim 14 including using file system semantics to assign affinity to at least one of: a particular set of data, a part of a set of data, a directory in a file system, a set of directories in a file system, a file in a file system, a set of files in a file system, a part of a file, device-blocks, a data segment, a group of data segments, a range of data segments, a byte range or set of ranges in a file, subsets of entries in a directory, tables in a database, rows in a database, columns in a database, particular keys in a key-value store, specific mailboxes in an email system, and specific customer accounts in a CRM system, and specific objects in an object store of some kind.

19. The method of claim 18 wherein the set of data is hierarchical or predominately hierarchical, and including assigning inherited affinity based on hierarchy.

20. The method of claim 18 including reassigning affinity based on a recognized justification during loss of communication.

21. The method of claim 14 including assigning Read Only affinity which causes an associated part of the set of data to be readable by all sites.

22. The method of claim 14 including assigning Laissez Faire affinity which allows all sites to make changes to an associated part of the set of data.

23. The method of claim 14 including assigning Read-Laissez-Faire affinity which allows the first site to have Write affinity to an associated part of the set of data and the second site to have Read affinity to the associated part of the set of data.

24. The method of claim 14 including applying restrictions to affinity based on client ID, filename, directory name, time, or any other expression that can be processed.

25. The method of claim 14 including automatically resolving at least some differences between the first copy and the second copy.

26. The method of claim 25 including automatically resolving at least some differences between the first copy and the second copy by utilizing a plug-in resolver.

27. An apparatus comprising:
   a first non-transitory physical data storage device associated with a first site, a first copy of a set of data being maintained on the first data storage device;
   a second non-transitory physical data storage device associated with a second site, a second copy of the set of data being maintained on the second data storage device;
   a third data storage device associated with a third site, a third copy of the set of data being maintained on the third data storage device;
   an interface for communicating between the first site, the second site and the third site to maintain consistency of the copies of the set of data; and
   control logic stored in computer-readable non-transitory memory and utilized by processing hardware, the control logic responsive to loss of communication between a first subset and a second subset of a set of sites, the first subset comprising the first site and the second site, and the second subset comprising the third site, to use affinity to control access to the first copy and the second copy and the third copy such that the first subset has access to a first part of the set of data and the second subset has access to a second part of the set of data, the second part comprising different data than the first part, where affinity is an indication that a particular subset of sites has or should be given permission to perform an operation to a particular part of the set of data and in response to restoration of communication between the first subset and the second subset to resolve differences between the various copies.

* * * * *